United States Patent [19]

Sato et al.

[11] 4,294,529
[45] Oct. 13, 1981

[54] CAMERA

[75] Inventors: Yasuhisa Sato, Kawasaki; Sadahiko Tsuji; Kazuo Ishikawa, both of Yokohama, all of Japan

[73] Assignee: Canon Kabushiki Kaisha, Tokyo, Japan

[21] Appl. No.: 70,659

[22] Filed: Aug. 28, 1979

[30] Foreign Application Priority Data

Sep. 7, 1978 [JP] Japan .............. 53-122915[U]
Sep. 7, 1978 [JP] Japan .............. 53-122916[U]

[51] Int. Cl.³ ............................................ G03B 17/20
[52] U.S. Cl. .................................................... 354/53
[58] Field of Search ............... 354/155, 289, 218, 219, 354/224, 225, 200, 217, 53, 54; 352/170–172

[56] References Cited

U.S. PATENT DOCUMENTS

| 3,668,985 | 6/1972 | Wazumi .................... 354/53 X |
| 4,114,995 | 9/1978 | Stieringer et al. .......... 354/218 X |
| 4,142,786 | 3/1979 | Suzuki et al. ............... 354/53 X |
| 4,165,930 | 8/1979 | Matsumoto et al. ........... 354/53 |

Primary Examiner—Donald A. Griffin
Attorney, Agent, or Firm—Toren, McGeady & Stanger

[57] ABSTRACT

In the camera disclosed, a volume type diffraction device having an indicium recorded therein to be reproduced later, is sealed between transparent optical members and arranged in the finder optical path so that when illuminated by a light source at an oblique angle, the indicium is reproduced, represents photographic information to be displayed in the finder.

8 Claims, 12 Drawing Figures

CAMERA

BACKGROUND OF THE INVENTION

This invention relates to cameras, and more particularly to improvements in the camera, disclosed, for example, in U.S. Pat. application Ser. No. 830,036 filed Sept. 2, 1977, and now U.S. Pat. No. 4,165,930 issued Aug. 28, 1979 by utilizing a diffraction device such as hologram for displaying information in the field of a view finder.

Figure 1:
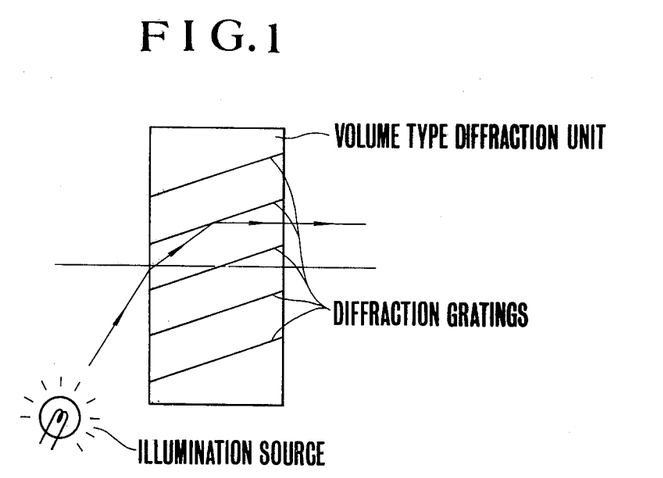
FIG. 1 is a schematic view showing the diffraction grating structure of the volume type diffraction device.
Figure 2:
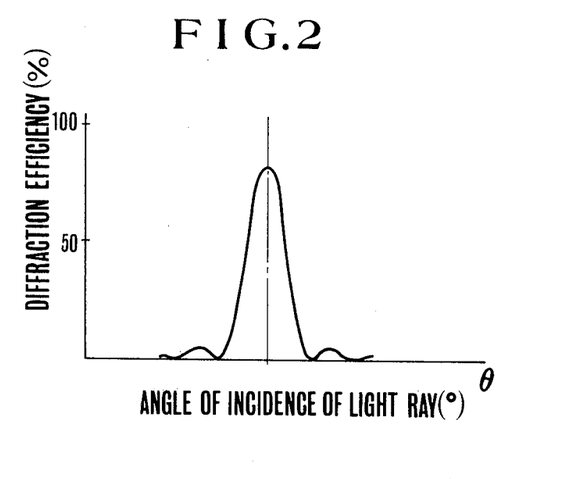
FIG. 2 is a graph showing variation of the diffraction efficiency with angle of illumination incident upon the diffraction device of FIG. 1.

Of the various diffraction devices which exist, the so called volume type diffraction device has a three-dimensional structure as shown in FIG. 1. This diffraction grating structure uses either density or refractive index distribution. The characteristic feature of such a volume type diffraction devices resides in that the diffraction efficiency can be maximized only for a light beam having a particular angle of incidence, provided that proper conditions prevail. In other words, such a diffraction device has its share of strong directional characteristics in terms of diffraction efficiency, as shown in FIG. 2. Here, the diffraction efficiency is shown as varying with the angle of incidence of a monochromatic light illuminating the volume type diffraction device.

A phase volume type hologram is one type of such volume type diffraction devices and has a diffraction grating structure which uses refractive index distribution. This phase volume type hologram is characterized in that (1) the diffraction efficiency is very large;

that (2) the range of angles for the maximum diffraction efficiency is narrow;

that (3) the hologram can be made transparent; and that (4) the reproduced image is formed on a hologram dry plate.

The use of this phase volume type hologram in an information display device of a camera or the like as arranged, for example, in the finder system thereof, produces little adverse effect on the viewfield of the finder (the darkening of the viewfield, feeling of annoyance because of the unnecessary presentation of a hologram pattern, etc.). Further, the presentation of information can be controlled because a light beam can reproduce the indicia recorded in the hologram only when the angle of illumination coincides with a certain particular value. By changing the wavelength of illumination light and the angle of illumination it is also made possible to display multiple informations.

In practice, however, the application of such diffraction device in a camera for purposes of displaying information in the viewfield of the finder gives rise to many problems. For example, as has been mentioned above, this kind of diffraction device is generally constructed in an emulsion medium in the diffraction grating form. Since the emulsion is susceptible of oxidation, the diffraction device on the base of such emulsion is apt to lower its diffraction efficiency. And, the loss of diffraction efficiency lowers the brightness, and the sharpness of the reproduced image. Another problem is that as the humidity varies, the emulsion shrinks or swells so that the color tone of the reproduced image is varied extensively. In general, the atmosphere in which the camera is used varies over a wide range. Therefore, some provision must be made for always assuring a clear display of information despite variation of ambient atmosphere, so that the reproduced image is stabilized against the reduction of brightness and sharpness, variation of color tone, and the like. Aside from this, there is still the problem that such a diffraction device restricts the position of the reproduced image within narrow limits itself (for example, in a phase volume type hologram, that position coincides with the hologram dry plate.) Therefore, in cameras, to achieve a clear display of information in the field of view of the finder, it is also necessary to take into account where to dispose the hologram.

An information display apparatus utilizing such a diffraction device may be considered as being divided into two parts, one of which includes the diffraction device and serves as the source of indicia to be displayed, and the other of which is a reproduction system including an illumination light source. For arrangement of the diffraction device for the maximum diffraction efficiency, the relative position of both parts is automatically fixed. Hence, the space which the apparatus is intended to occupy is large in comparison with the interior of the finder system. On the other hand, modern cameras are extremely compact and leave little space for appropriate incorporation of an additional new apparatus. The above-mentioned information display apparatus could not be incorporated in the camera without sacrificing compactness. Further, the provision of such an apparatus in a camera with minimum bulk and size requires great effort in arranging of those of the parts of the camera which surround the apparatus in order that requirements of the indicium source and the illumination source for maximum diffraction efficiency prevail. A further problem is that the indicium source and the illumination source must be assembled under specific conditions. Hence, difficulties are introduced into the working operation, and the necessity of fine adjustment for obtaining the maximum diffraction efficiency, in particular, decelerates the speed of a production run.

SUMMARY OF THE INVENTION

With the foregoing considerations in mind, a first object of the present invention is to provide a camera utilizing a diffraction device for displaying information in the field of view of the finder thereof, while permitting the reproduced image of an indicium on the diffraction device to always be clearly viewed despite, years of use, and a large variation of ambient atmosphere of the camera when in use, by stabilizing the reproduced image of the indicium against reduction of the brightness and sharpness due to the loss in diffraction efficiency and against variation of the color tone due to the shrinkage and expansion of the base of the diffraction device.

A second object of the present invention is to provide an improved form of an information display apparatus which requires a very small rate of space when incorporated within a compact instrument such as a camera, and, moreover, which requires no complicated production techniques such as fine adjustment when the practical incorporation process is performed.

To achieve these objects, according to one of the features of the invention, a diffraction device having recorded therein an indicium to be displayed is sealed between two optical members and is arranged with the reproduced image of the indicium assuming a position at least near to the focal plane of a photo-taking optical system, or an optically conjugate plate thereto, thereby information is displayed in the field of view of the finder. In other words, the diffraction device is shielded from the ambient atmosphere by the two optical members to protect the base substance of the diffraction device from oxidation and dimensional change as the humidity varies, so that the brightness and sharpness and color tone of the reproduced image can be maintained unchanged from the optimum level for a long time in order to insure that when the diffraction device is adjusted in position as has been described above, the display of indicium can be always clearly viewed in the field of view of the finder.

Another feature of the invention is that the light source for illuminating the diffraction device is arranged in unison with an optical member which is adapted to support or protect the diffraction device, so that the illumination light after having been reflected from the surfaces of the optical member a number of times reaches the diffraction device.

The particular features that characterize the invention are pointed out in the claims. Other objects and advantages will be evident from the following description of the present invention with respect to embodiments thereof by reference to the accompanying drawings.

DETAILED DESCRIPTION OF PREFERRED EMBODIMENTS

Figure 3:
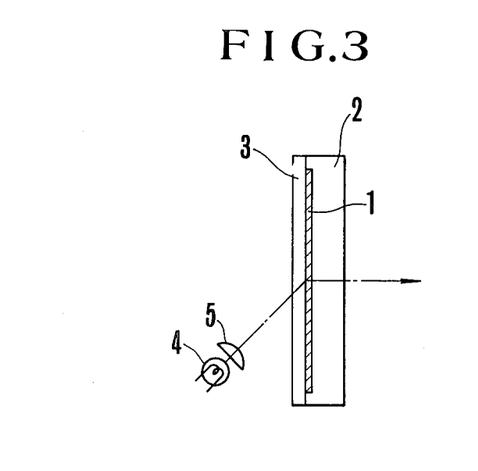
FIG. 3 is a view showing the basic arrangement of the diffraction device and an illumination source according to the invention as applied to display information in the camera.

In FIG. 3, a diffraction device is utilized in displaying information in the camera. Here, a transparent glass plate 2 forms an optical member for supporting the diffraction device 1 in a recessed portion thereof. The diffraction device 1 is constructed from an emulsion layer applied in the recessed portion in the form of diffraction gratings. A second transparent glass plate 3 forms an optical protection member for the diffraction device 1 and is air-tightly assembled with the first glass plate 2 to shield the device 1 from the ambient atmosphere. The loss in diffraction efficiency due to oxidation and the deformation of the emulsion layer due to variation of humidity are prevented. An illumination light source 4 for the diffraction device 1 is in this instance, formed from an incadescent lamp. This light source 4 may be monochromatic, for example, a light-emitting diode. A collector lens 5 is positioned in front of the illumination source 4.

In such information display arrangement, when light from the illumination source 5 is projected by the collector lens 5 through the protection glass plate 3 onto the diffraction device from a certain direction, a display indicium such as a mark previously recorded on the diffraction device in the form of diffraction pattern is reproduced by the diffraction phenomenon in said diffraction device. This reproduced image appears on said diffraction device provided that the diffraction device is the above-mentioned phase volume type holograms. Therefore, this can be observed behind the support glass plate 2.

Figure 4:
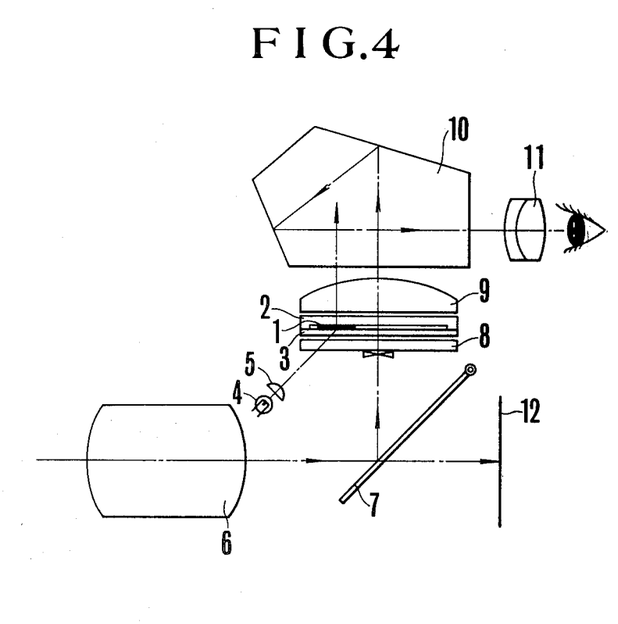
FIG. 4 is a sectional view of a first embodiment of an information display apparatus according to the present invention incorporated in a single lens reflex camera.

The first embodiment of the present invention as applied to a single lens reflex camera is illustrated in FIG. 4. Light from an object (not shown) being photographed enters an objective lens 6 and then reflected from a quick return mirror 7 to a focusing screen 8 where an image of the object is formed. Light from the focusing screen 8 is collected by a condenser lens 9 and then directed through a penta-prism 10 and an eye-piece 11, reaching an eye of the photographer. When the mirror is pivoted up, light from the lens 6 strikes a film plane 12. This finder optical system utilizes the information display apparatus of FIG. 3 with the above-described diffraction device 1 (in this instance, of the volume type) sealed by the transparent glass plates 2 and 3. The assembly 1, 2, and 3 is positioned adjacent the focusing screen 8, for example, in a space between the focusing screen 8 and the condenser lens 9 as shown in the figure. The illumination light source 4 and the collector lens 5 are disposed to illuminate the diffraction device 1 diagonally from the lower front of the focusing screen 8 as viewed in FIG. 4 after the passage through the focusing screen 8 and the protection glass plate 3.

Figure 5:
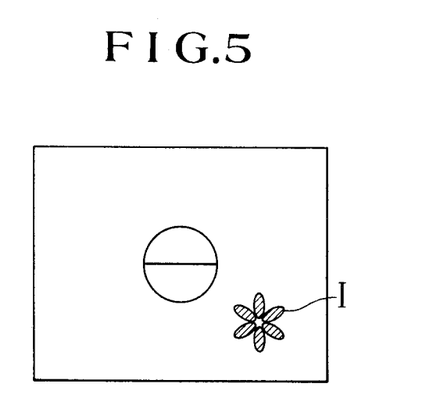
FIG. 5 is a plan view of a pictorial representation of a mark in the field of view of the finder of FIG. 4.

When such arrangement of the display apparatus is in the inoperative state, as is usual, the photographer looking through the finder can observe nothing but the object image. Then, when the incandescent lamp 4 is energized to illuminate the diffraction device 1, an image of the indicium such as mark recorded on the diffraction device 1 is reproduced, and appears at a plane coincident with the plane of the diffraction layer 1, that is, at least adjacent the focusing screen 8. In this state, therefore, the reproduced image I of the mark appears in the field of view of the finder as shown in FIG. 5.

Figure 6:
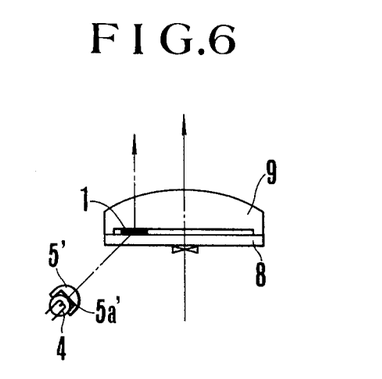
FIG. 6 is a sectional view of an example of modification of the apparatus of FIG. 4.

In connection with the finder system of FIG. 4 it is to be noted that as shown in FIG. 6, the diffraction layer 1 may be directly assembled with the focusing screen 8 and the condenser lens 9 so that there is no need to use the support and protection glass plates 2 and 3. This offers the advantage of compactness of the finder system and facilitates improvements in simplification and accuracy of the assembly of the parts of the system. In addition thereto, because the position of the diffraction device 1 nears the conjugate plane to the focal plane of the objective lens 6, the presentation of the information display can be made clearer. A further improvement is made in the illumination system by providing for a collector lens 5' (FIG. 6) with a recessed portion 5a' in which the lamp 4 is contained. Thus, the position of the illumination system relative to the diffraction device 1 can be adjusted with higher accuracy and more easily.

Figure 7:
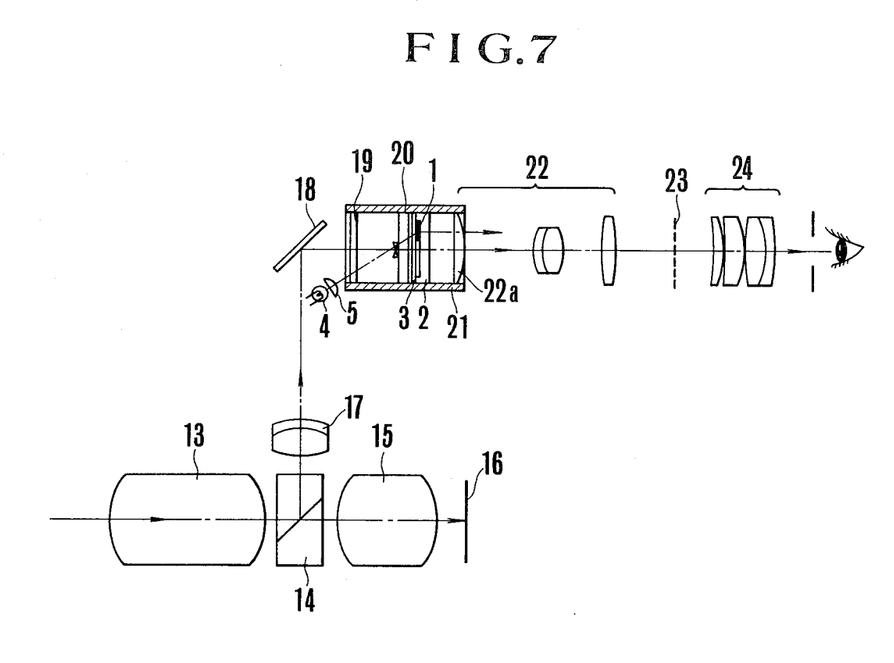
FIG. 7 is a sectional view of a second embodiment of an information display apparatus according to the present invention applied to a cine camera.

A second embodiment of the present invention applied for use in a cine camera is illustrated in FIG. 7. The cine camera includes an objective lens comprising front and rear groups 13 and 15 separated from each other by a space in which a beam splitter 14 is disposed to reflect a part of the light entering the front group 13 to a finder objective lens 17. That part of the light which passes through the beam splitter 14 is focused by the rear lens group 15 on a film plane 16. Light emerging from the objective lens 17 is reflected from a mirror 18 through a dust-proof glass plate 19 to form an object image on a focusing screen 20 positioned at a location corresponding to the first focal plane. The image at the first focal plane, that is on the focusing screen 20, is then made erect by a lens group 22 at a second focal plane 23. Then the image at the second focal plane 23 is enlarged by an eye-piece 24 and can be observed by the photographer looking therethrough.

The finder optical system uses the information display apparatus with the diffraction device 1, supported between the sealed transparent glass plates 2 and 3 and positioned adjacent the first focal plane, in this instance, just behind the focusing screen 20 within a dust-proof tube 20. The dust-proof glass plate 19 admits the tube 21 at the front opening thereof, and the frontmost lens element 22a of the erecting lens group 22 at the rear opening thereof. The lamp 4 and the collector lens 5 are positioned outside the dust-proof tube 21 with the optical axis of the lens 5 passing through the dust-proof glass plate 19, focusing screen 20 and protection glass plate 3 to the diffraction device 1.

When the lamp 4 is lit to illuminate the diffraction device 1, an image of the mark recorded on the diffraction device 1 is reproduced, and, in this case, because of the hologram being of the volume type, takes place at a location coincident with the diffraction device 1 itself, that is, at least adjacent the first focal plane. The image is then refocused at a location at least adjacent the second focal plane 23 by the lens group 22. As a result, the mark image I of FIG. 5 can be clearly viewed by the photographer looking through the eye-piece 24.

Figure 8:
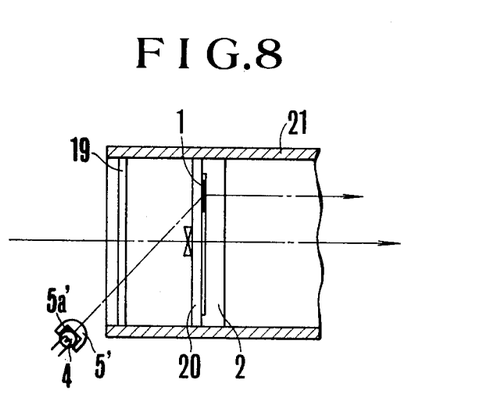
FIG. 8 is a sectional view showing an example of modification of the apparatus of FIG. 7.

With regard to the construction and arrangement of FIG. 7, it should be noted that as shown in FIG. 8, the protection glass plate 3 for the diffraction device 1 may be replaced by the focusing screen 20 to obtain an equivalent advantage to that described in connection with FIG. 6.

In the camera shown in FIG. 4 or FIG. 7, it is possible that whilst the object image is being observed in the field of view of the finder, the display of the indicium recorded in the diffraction device 1 is reproduced by illuminating the device only when need arises, thereby informing the operator looking thorugh the finder of what has happened. For this purpose, a control circuit for selectively energizing the illumination source or lamp 4 is provided in cooperation with some mechanism of the camera, for example, the exposure control mechanism, or the film winding up or advancing mechanism. In this way, a warning display for over- or under-exposure, film end, or film winding or advance error can be presented. Further, in this case, various different data can be selectively displayed by intermittently energizing the lamp 4, or by changing the color tone as the illumination angle is changed, or by varying the frequency of actuating pulses for the lamp.

Figure 9:
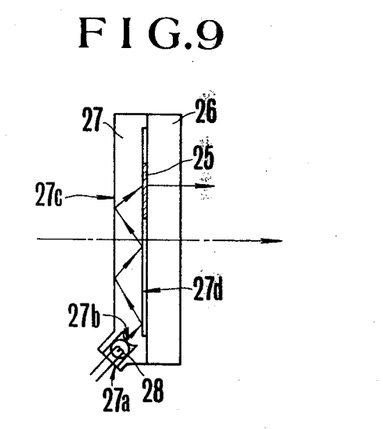
FIG. 9 is a sectional view showing a third embodiment of the invention.

FIG. 9 shows a third embodiment of the present invention. Here, a transparent glass 26 forms an optical member for supporting (or protecting) a diffraction device 25; and another transparent glass 27 forms an optical member for protecting (or supporting) the diffraction device 25. The diffraction device 25 takes the form of an emulsion layer applied on the surface of the transparent glass 26 or in a recessed portion of the glass 27 and has a diffraction grating structure of a pattern corresponding to a desired indicium. The device 25 is air-tightly shielded by the two transparent glasses. On the other hand, the transparent glass 27 is provided with a diagonally projecting portion in which a hole 27a is formed to accommodate an illumination light source 28 (in this instance, lamp) in fixedly secured relation by an adhesive or the like. The hole 27a is so oriented that the light emanating from the lamp 28 is alternately reflected from the both surfaces 27c and 27d of the transparent glass plate 27 a number of times, and finally impinges the diffraction device 25 at an optimum angle of incidence, that is, an angle of incidence that produces the maximum diffraction efficiency.

With such a construction and arrangement, when the illumination light source 28 is energized, light from the illumination light source 28 after having been totally reflected from the surfaces 27c and 27d of the glass plate 27 illuminates the diffraction device 1 at the predetermined angle of incidence. As a result, the indicium previously recorded in the diffraction device 25 is reproduced. This permits the reproduced image to be observed behind the transparent glass 26. According to this embodiment, because the diffraction device serving as the indicium source and the illumination system therefor are integrated into a single member, it occupies a very small space as required, for example, in the finder of the camera. This facilitates compactness of the finder employing the apparatus, and, moreover, simplifies the assembly work. This is especially so because the spatial relationship of the indicium source and the illumination system is established in manufacturing the information display apparatus themselves. Hence, incorporation of the apparatus into an instrument requires no time-consuming and troublesome position adjustment.

It is to be noted that the above construction may be varied, for example, by configuring the bottom surface of the hole 27a as a spherical surface 27b of outward convexity as shown in FIG. 9 so that light from the lamp 28 is collimated.

Figure 10:
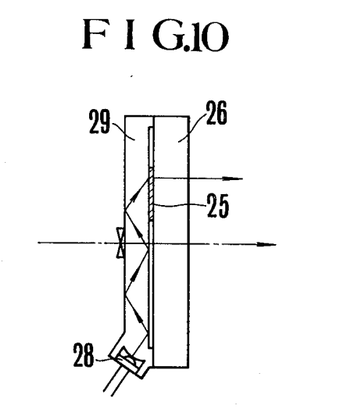
FIG. 10 is a sectional view showing a fourth embodiment of the invention.

FIG. 10 shows a fourth embodiment of the present invention. Here, the diffraction devices protecting (or supporting) glass 27 of FIG. 9 serves as the focusing screen 29 of the camera, while the illumination light source (in this instance, an LED) is incorporated into the glass 27, 29 and arranged in a position similar to that described in connection with FIG. 9.

Figure 11:
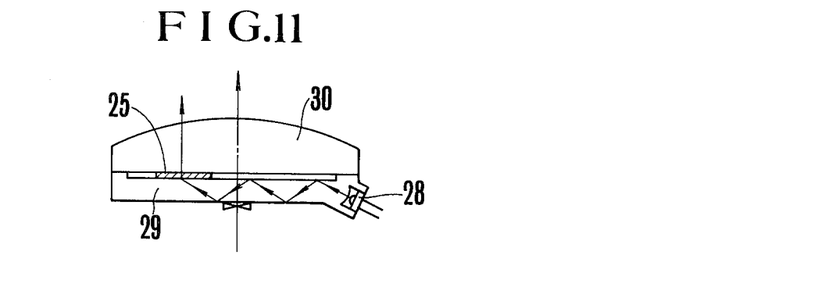
FIG. 11 is a sectional view showing a fifth embodiment of the invention.

FIG. 11 shows a fifth embodiment of the present invention adapted particularly for use in the single lens reflex camera by configuring the opposite glass 26 of FIG. 10 as a condenser lens.

The embodiments of FIGS. 10 and 11 utilize one or more of the intrinsic optical components of the camera in accomplishing the object of shielding the diffraction device from the ambient atmosphere. This affords the additional advantage that the information display apparatus employing the diffraction device can be incorporated in a camera without unduly large sacrifice in the compactness of the camera, while the necessary number of optical components as a whole is minimized.

Figure 12:
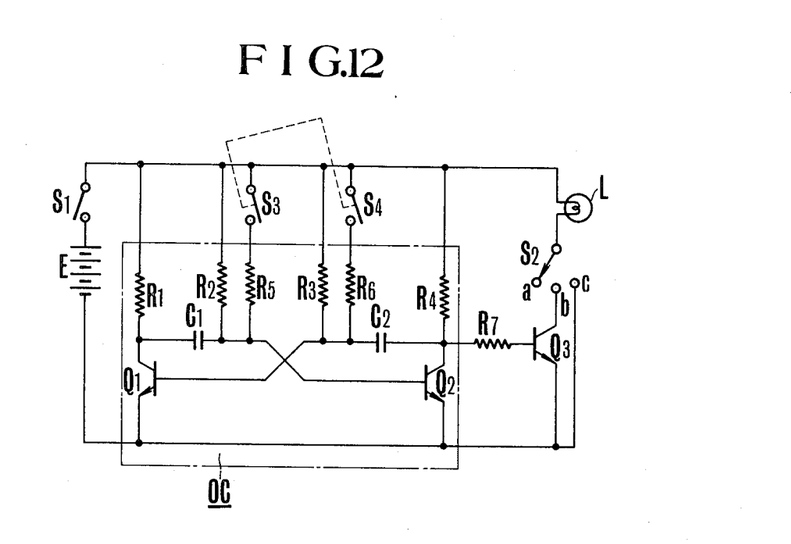
FIG. 12 is an electrical circuit diagram showing an example of a display control circuit.

An example of a control circuit for the above-described information display apparatus as applied to the camera is shown in FIG. 12. The example shown here is adapted to control energization of the above-described illumination light source intermittently at two different frequencies and also continuously. Thus, the display can serve for selectively presenting three data in total. In more detail, when in a cine camera, the informations represent warnings of a film end, for example, 5 feet ahead; 2 feet ahead, and the film end.

The circuit of FIG. 12 includes a battery E, a power switch S1, an oscillator OC. The latter is in the form of a mono-stable multivibrator comprised of transistors Q1, Q2, condensers C1, C2, and resistors R1-R6 with the two resistors R5 and R6 being arranged to be selectively connected therein, so that the multivibrator oscillates at either of two frequencies f1, and f2 ($>$f1). A transistor Q3 is arranged to receive the output pulses of the above-described oscillator circuit OC through a resistor R7. A lamp L serves as the illumination light source for the diffraction device. A selector switch S2 is connected to the lamp L and arranged to cooperate with a footage mechanism (not shown) so that when the film is within 5 feet of its end, the switch is moved from its "a" to "b" position where the lamp L is connected to the collector of the transistor Q3. At the film end, the switch S2 is moved from its "b" to its "c" position where the lamp L is connected to the negative terminal of the battery E. Switches S3 and S4 are cooperative with each other and arranged to reach the film within 2 feet of its end, to be closed simultaneously.

As the film strip is transported from the supply to the take-up reel while being exposed, and before the film under exposure is more than 5 feet ahead of a film end, the switch S2 is set in the "a" position where the lamp L is not lit. Therefore, the indicium recorded in the diffraction device 1 is not yet reproduced. Then, 5 feet from the end, the switch S2 is switched from "a" to "b" position where since the switches S3 and S4 remain open, the lamp L is intermittently energized by output pulses from the oscillator circuit OC at the frequency f1. Hence, the display of the indicium recorded in the diffraction device 1 is intermittently presented. This informs the photographer looking through the finder of the fact that the film will terminate in 5 feet or less. As the transportation of film proceeds, at 2 feet from the film end, the switches S3 and S4 are closed to change the frequency from f1 to f2. Thus, the lamp L is intermittently lit more frequently. At last, when no more fresh film is available, the switch S2 is switched to "c", where the lamp L is continuously lit with continuous presentation of the indicium display.

As has been described in detail, according to the present invention, the camera of the type employing a diffraction device in displaying information in the field of view of the finder is improved in performance of the display by stabilizing the diffraction device against aging, loss in the brightness and sharpness of the reproduced image due to the lowering of the diffraction efficiency, and variation of the color tone due to the shrinkage and swell of the diffraction material.

Further, according to the embodiments shown in FIGS. 6 and 11, the intrinsic optical components of the camera and those of the information display system can be unified in part to effect improvements in the compactness of the assembly, low-cost production techniques and the tolerances of design parameters. In addition thereto, since the diffraction device of the invention can be positioned as near to the conjugate plane to the focal plane of the photo-taking lens as was previously possible, the reproduced image can be viewed more clearly.

In the above-described embodiments, the optical members for mounting the diffraction device are shown as made of glass, but it is to be understood that the present invention is not confined thereto. For example, transparent plastics may be used. Particularly, the protection optical member for the diffraction device may be made of transparent film, transparent Mylar, or the like. In a further advance, it may take the form of a transparent coating layer. From this standpoint, it is possible to fabricate the diffraction device in such a manner that an emulsion layer is applied on an optical support member of transparent film, transparent Mylar or the like, then the diffraction gratings are formed in the emulsion layer and, then the emulsion layer is covered by a transparent film, transparent Mylar, or a transparent coating to produce the indicium source. This is then applied to the focusing screen or condenser lens.

While embodiments of the invention have been described in detail, it will be evident to those skilled in the art that the invention may be otherwise embodied within its spirit and scope.

What is claimed is:

1. A camera apparatus, comprising:
   a photo-taking optical system;
   a finder optical system including a focusing screen;
   a diffraction device arranged near one of a plurality of predetermined planes including a focal plane of said photo-taking optical system and an optically conjugate plane thereto and having recorded therein on indicium to be displayed;
   a pair of optical members,
   said diffraction device being supported and sealed between the two optical members;
   a light source for illuminating said diffraction device from an oblique direction; and
   an electrical power circuit for energizing said light source.

2. An apparatus as in claim 1, wherein said diffraction device is constructed in the form of a volume type diffraction device.

3. An apparatus as in claim 1, wherein at least one of two optical members for supporting said diffraction device forms a focusing screen.

4. An apparatus as in claim 3, wherein said focusing screen simultaneously holds the light source for illuminating said diffraction device.

5. An apparatus as in claim 1, wherein at least one of said two optical members for supporting said diffraction device is a condenser lens for collecting light from said focusing screen.

6. An apparatus as in claim 2, wherein said diffraction device supported by said optical members is hermetically sealed in a dust-proof tube.

7. An apparatus as in claim 2, wherein one of said optical members simultaneously holds said light source for illuminating said diffraction device, and the light from the light source, said light source being oriented to be reflected a number of times within said optical member and then to illuminate said diffraction device.

8. An apparatus as in claims 1, 3, 5, 6, 7, or 4, wherein said diffraction device includes a diffraction grating.

* * * * *